United States Patent
Kwon et al.

(10) Patent No.: US 11,316,640 B2
(45) Date of Patent: Apr. 26, 2022

(54) METHOD OF TRANSMITTING SCHEDULING REQUEST IN A WIRELESS COMMUNICATION SYSTEM

(71) Applicant: Microsoft Technology Licensing, LLC, Redmond, WA (US)

(72) Inventors: Yeong Hyeon Kwon, Anyang-si (KR); Seung Hee Han, Anyang-si (KR); Hyun Woo Lee, Anyang-si (KR); Jae Hoon Chung, Anyang-si (KR); Jin Sam Kwak, Anyang-si (KR); Dong Cheol Kim, Anyang-si (KR); Min Seok Noh, Anyang-si (KR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 147 days.

(21) Appl. No.: 15/970,551

(22) Filed: May 3, 2018

(65) Prior Publication Data

US 2018/0254873 A1    Sep. 6, 2018

Related U.S. Application Data

(60) Division of application No. 15/488,246, filed on Apr. 14, 2017, now Pat. No. 9,985,767, which is a
(Continued)

(30) Foreign Application Priority Data

Jul. 12, 2007   (KR) .................... 10-2007-0069991
Oct. 15, 2007   (KR) .................... 10-2007-0103661

(51) Int. Cl.
*H04W 4/00* (2018.01)
*H04L 5/00* (2006.01)
(Continued)

(52) U.S. Cl.
CPC .......... *H04L 5/0053* (2013.01); *H04L 5/0007* (2013.01); *H04L 5/0091* (2013.01);
(Continued)

(58) Field of Classification Search
CPC ..................................................... H04L 5/0007
See application file for complete search history.

(56) References Cited

U.S. PATENT DOCUMENTS 6,542,478 B1 *  4/2003  Park ................. H04B 1/707
                                              370/308
7,567,639 B2 *  7/2009  Huh ................ H04L 25/022
                                              375/365
(Continued)

FOREIGN PATENT DOCUMENTS

EP        1 780 925        5/2007
EP        1 814 236        8/2007
(Continued)

OTHER PUBLICATIONS

"Physical Channels and Modulation (Release 8)", 3rd Generation Partnership Project, Technical Specification Group Radio Access Network 36.211 V1.0.0, Mar. 2007, 30 Pages.
(Continued)

*Primary Examiner* — Guang W Li
(74) *Attorney, Agent, or Firm* — Ray Quinney & Nebeker P.C; James Bullough

(57) ABSTRACT

A method and apparatus for requesting uplink resources in a wireless communication system is provided. A user equipment determines whether a scheduling request for requesting uplink resources is triggered. If the scheduling request is triggered, the user equipment transmits a first set of frequency domain sequences and a second set of frequency domain sequences in a subframe.

20 Claims, 20 Drawing Sheets

Related U.S. Application Data continuation of application No. 15/411,195, filed on Apr. 28, 2016, now Pat. No. 9,655,084, which is a continuation of application No. 13/926,754, filed on Jun. 25, 2013, now Pat. No. 9,357,530, which is a continuation of application No. 13/449,130, filed on Apr. 17, 2012, now Pat. No. 8,509,178, which is a continuation of application No. 12/591,091, filed on Nov. 6, 2009, now Pat. No. 8,179,857, which is a continuation of application No. 12/451,124, filed as application No. PCT/KR2008/004087 on Jul. 11, 2008, now Pat. No. 7,852,743.

(51) Int. Cl.
| | |
|---|---|
| H04W 74/08 | (2009.01) |
| H04W 72/04 | (2009.01) |
| H04L 27/26 | (2006.01) |
| H04W 72/12 | (2009.01) |

(52) U.S. Cl.
CPC ....... *H04L 27/261* (2013.01); *H04W 72/0406* (2013.01); *H04W 72/0413* (2013.01); *H04W 72/1263* (2013.01); *H04W 74/0866* (2013.01)

(56) References Cited

U.S. PATENT DOCUMENTS

| | | | |
|---|---|---|---|
| 7,664,193 B2 | 2/2010 | Jalali et al. | |
| 7,760,618 B2 | 7/2010 | Akita | |
| 7,778,151 B2 | 8/2010 | Bertrand et al. | |
| 7,813,296 B2* | 10/2010 | Lindoff | H04L 1/1854 |
| | | | 370/252 |
| 7,957,759 B2 | 6/2011 | Papasakellariou | |
| 8,014,264 B2 | 9/2011 | Li et al. | |
| 8,031,688 B2 | 10/2011 | Papasakellariou et al. | |
| 8,036,197 B2 | 10/2011 | Pajukoski et al. | |
| 8,059,735 B2* | 11/2011 | Shen | H04W 72/0406 |
| | | | 375/260 |
| 8,160,012 B2* | 4/2012 | Chun | H04W 72/1284 |
| | | | 370/329 |
| 8,179,780 B2 | 5/2012 | Kim et al. | |
| 8,199,706 B2* | 6/2012 | Bertrand | H04L 27/2613 |
| | | | 370/329 |
| 8,228,784 B2 | 7/2012 | Coon | |
| 8,238,320 B2 | 8/2012 | Kim et al. | |
| 8,265,682 B2* | 9/2012 | Bertrand | H04W 52/0225 |
| | | | 455/522 |
| 8,570,910 B2* | 10/2013 | Iwai | H04L 27/2614 |
| | | | 370/260 |
| 8,693,428 B2 | 4/2014 | Kishiyama et al. | |
| 8,861,330 B2 | 10/2014 | Kwak et al. | |
| 9,154,276 B2 | 10/2015 | Akimoto et al. | |
| 9,166,717 B2* | 10/2015 | Bertrand | H04J 3/06 |
| 9,474,054 B1* | 10/2016 | Pawar | H04W 72/0413 |
| 9,497,775 B2* | 11/2016 | Chung | H04L 1/1887 |
| 10,084,627 B2 | 9/2018 | Malladi et al. | |
| 2005/0099975 A1 | 5/2005 | Catreux et al. | |
| 2006/0056529 A1* | 3/2006 | Huang | H04B 7/02 |
| | | | 375/260 |
| 2007/0183386 A1 | 8/2007 | Muharemovic et al. | |
| 2007/0211656 A1 | 9/2007 | Kwak et al. | |
| 2007/0297386 A1* | 12/2007 | Zhang | H04L 5/06 |
| | | | 370/344 |
| 2008/0051098 A1* | 2/2008 | Rao | H04W 74/002 |
| | | | 455/452.1 |
| 2008/0075060 A1 | 3/2008 | Tiirola et al. | |
| 2008/0075184 A1* | 3/2008 | Muharemovic | H04L 1/1854 |
| | | | 375/260 |
| 2008/0075195 A1 | 3/2008 | Pajukoski et al. | |
| 2008/0273522 A1 | 11/2008 | Luo et al. | |
| 2008/0298488 A1 | 12/2008 | Shen et al. | |
| 2008/0298502 A1 | 12/2008 | Xu et al. | |
| 2008/0310395 A1 | 12/2008 | Kashima | |
| 2008/0310540 A1* | 12/2008 | Tiirola | H04J 13/00 |
| | | | 375/267 |
| 2008/0316959 A1* | 12/2008 | Bachl | H04W 72/1284 |
| | | | 370/329 |
| 2008/0318608 A1* | 12/2008 | Inoue | H04B 1/707 |
| | | | 455/509 |
| 2009/0011762 A1* | 1/2009 | Han | H04B 1/7083 |
| | | | 455/434 |
| 2009/0116434 A1* | 5/2009 | Lohr | H04W 72/14 |
| | | | 370/329 |
| 2009/0316811 A1* | 12/2009 | Maeda | H04W 72/1278 |
| | | | 375/260 |
| 2010/0034165 A1 | 2/2010 | Han et al. | |
| 2010/0085928 A1* | 4/2010 | Miki | H04L 1/1854 |
| | | | 370/329 |
| 2010/0085956 A1 | 4/2010 | Ahn et al. | |
| 2010/0103901 A1* | 4/2010 | Miki | H04W 88/08 |
| | | | 370/330 |
| 2010/0150099 A1 | 6/2010 | Chen et al. | |
| 2011/0222393 A1 | 9/2011 | Kwak et al. | |
| 2012/0213193 A1* | 8/2012 | Kwon | H04L 5/0007 |
| | | | 370/330 |
| 2014/0369223 A1* | 12/2014 | Takeda | H04J 11/0093 |
| | | | 370/252 |
| 2015/0189645 A1* | 7/2015 | Maeda | H04L 1/1858 |
| | | | 370/336 |

FOREIGN PATENT DOCUMENTS

| | | |
|---|---|---|
| JP | 2008-028974 | 2/2008 |
| JP | 2010/519879 | 3/2010 |
| JP | 2010-518776 | 5/2010 |
| JP | 2010-529709 | 8/2010 |
| RU | 2005 106 874 A | 8/2005 |
| WO | WO 2007/003707 A1 | 1/2007 |
| WO | 2007016312 A2 | 2/2007 |
| WO | WO 2007/016312 A2 | 2/2007 |
| WO | WO 2007/095860 | 8/2007 |
| WO | WO 2008/100076 | 8/2008 |
| WO | WO 2008/137963 | 11/2008 |
| WO | WO 2008/153298 | 12/2008 |
| WO | WO 2008/153350 | 12/2008 |

OTHER PUBLICATIONS

Universal Mobile Telecommunications System (UMTS); Evolved Universal Terrestrial Radio Access (E-UTRA) and Evolved Universal Terrestrial Radio Access (E-UTRAN); Overall description; Stage 2 The European Telecommunications Standards Institute (ETSI), Technical Specification 136 300 V8.0.0, Mar. 2007, 84 Pages.

"Physical layer Procedures (Release 8)", 3rd Generation Partnership Project, Technical Specification Group Radio Access Network 36.213 V1.2.0, May 2007, 10 Pages.

"UMTS Long Term Evolution (LTE) Technology Introduction", Retrieved from https://www.3g4g.co.uk/Lte/LTE_WP_0703_RandS.pdf, Mar. 2007, 32 Pages.

Liu, et al., "Evolution Map from TD-SCDMA to Future B3G TDD", In Proceedings of IEEE Communications Magazine, vol. 44, Issue 3, Mar. 20, 2006, 8 Pages.

Zyren, Jim, "Overview of the 3GPP Long Term Evolution Physical Layer", In White Paper of Freescale, Jul. 2007, 27 Pages.

Alcatel-Lucent: "Multiplexing the Scheduling Request in the Uplink", 3GPP TSF-RAN WG1 #49bis, Orlando, Florida, Jun. 25-29, 2007, R1-073066, XP50106721.

Nokia Siemens Networks: "Multiplexing of Scheduling Request and ACK/NACK and/or CQU", 3GPP TSF RAN WG1 #49bis, Orlando, Florida, Jun. 25-29, 2007, R1-073011, XP50106675.

Motorola: "E-UTRA Uplink L1/L2 Control Channel Mapping", 3GPP TSG RAN1 #47bis, Sorrento, Italy, Jan. 15-19, 2007, R1-070162. XP50104208.

(56) References Cited

OTHER PUBLICATIONS

"Notice of Allowance Issued in U.S. Appl. No. 16/392,454", dated Mar. 23, 2021, 16 Pages.

* cited by examiner

METHOD OF TRANSMITTING SCHEDULING REQUEST IN A WIRELESS COMMUNICATION SYSTEM

This application is a Divisional of U.S. patent application Ser. No. 15/488,246, filed Apr. 14, 2017, now allowed, which is a continuation of U.S. patent application Ser. No. 15/141,195, filed Apr. 28, 2016 (now U.S. Pat. No. 9,655,084, issued May 16, 2017), which is a continuation of U.S. patent application Ser. No. 13/926,754, filed Jun. 25, 2013 (now U.S. Pat. No. 9,357,530, issued May 31, 2016), which is a continuation of U.S. patent application Ser. No. 13/449,130, filed Apr. 17, 2012 (now U.S. Pat. No. 8,509,178, issued Aug. 13, 2013), which is a continuation of U.S. patent application Ser. No. 12/591,091, filed Nov. 6, 2009 (now U.S. Pat. No. 8,179,857, issued May 15, 2012), which is a continuation of U.S. patent application Ser. No. 12/451,124, filed Oct. 27, 2009 (now U.S. Pat. No. 7,852,743, issued Dec. 14, 2010), which is a 35 U.S.C. § 371 National Stage filing of International Application No. PCT/KR2008/004087, filed Jul. 11, 2008, and which claims priority to Korean Application No. 10-2007-0069991, filed on Jul. 12, 2007, and Korean Application No. 10-2007-0103661, filed Oct. 15, 2007, all of which are incorporated by reference in their entirety herein.

TECHNICAL FIELD

The present invention relates to wireless communications, and more particularly, to a method of transmitting a scheduling request on an uplink control channel in a wireless communication system.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future.

An orthogonal frequency division multiplexing (OFDM) system capable of reducing inter-symbol interference with a low complexity is taken into consideration as one of next generation (after 3G) systems. In the OFDM system, serial input data symbols are converted into N parallel data symbols and are carried and transmitted on separate N subcarriers. The subcarriers maintain orthogonality in a frequency dimension. Orthogonal frequency division multiple access (OFDMA) is a multiple access scheme in which multiple access is achieved by independently providing some of available subcarriers to a plurality of users in a system using the OFDM as a modulation scheme.

One of primary problems of the OFDM/OFDMA system is that a peak-to-average power ratio (PAPR) can be significantly large. The PAPR problem is that a peak amplitude of a transmit (Tx) signal is significantly larger than an average amplitude. This is caused by the fact that OFDM symbols are N sinusoidal signals overlapping on different subcarriers. In particular, since the PAPR is related to battery capacity, the PAPR is problematic when a user equipment (UE) is sensitive to power consumption. The PAPR needs to be reduced to decrease power consumption.

A single carrier-frequency division multiple access (SC-FDMA) system is one of systems proposed to reduce the PAPR. An SC-FDMA is a combination of a single carrier-frequency division equalization (SC-FDE) and a frequency division multiple access (FDMA). The SC-FDMA has a similar characteristic with an OFDMA in that data is modulated and demodulated in a time domain and a frequency domain by using a discrete Fourier transform (DFT). However, the SC-FDMA is advantageous over the OFDMA in terms of Tx power saving due to a low PAPR of a Tx signal. In particular, regarding the use of batteries, the SC-FDMA is advantageous in uplink communication in which communication is made to a base station (BS) from a UE sensitive to Tx power.

A wide coverage is important when the UE transmits data to the BS. Although a bandwidth of Tx data is small, power can be concentrated in the wide coverage. The SC-FDMA system provides a signal with little variation, and thus has a wider coverage than other systems when the same power amplifier is used.

In order to implement various transmission or reception methods to achieve high-speed packet transmission, transmission of a control signal on time, spatial, and frequency domains is an essential and indispensable factor. A channel for transmitting the control signal is referred to as a control channel. An uplink control signal may be various such as an acknowledgement (ACK)/negative-acknowledgement (NACK) signal which is a response for downlink data transmission, a channel quality indicator (CQI) indicating downlink channel quality, a precoding matrix index (PMI), a rank indicator (RI), etc.

One example of the control signal is a scheduling request. The scheduling request is used when a UE requests a BS to allocate an uplink radio resource. The scheduling request is a sort of preliminary information exchange for exchanging uplink data. The UE first transmits the scheduling request and is allocated with an uplink radio resource. Thereafter, the UE transmits uplink data to the BS. When in an idle mode, the UE can transmit an uplink radio resource allocation request through a conventional random access process. However, when in a connected mode, a service may be delayed if the UE transmits the uplink radio resource allocation request through the conventional random access process. This is because the random access is a contention based process, and thus allocation of the uplink radio resource can be delayed. Therefore, when in the connected mode, the scheduling request may be transmitted through a control channel in order to provide effective resource allocation in a more reliable and rapid manner.

Compatibility with another control channel for transmitting another control signal has to be taken into consideration when the scheduling request needs to be transmitted on an uplink control channel. In addition, capacity of the control channel for transmitting the scheduling request has to be also taken into consideration.

Accordingly, there is a need for a control channel having an effective structure for transmitting a scheduling request.

DISCLOSURE OF INVENTION

Technical Problem

A method is sought for requesting a radio resource for uplink transmission on an uplink control channel in a wireless communication system.

A method is also sought for transmitting a scheduling request which is used to request a radio resource for uplink transmission in a wireless communication system.

Technical Solution

In an aspect, a method of transmitting a scheduling request which is used to request a radio resource for uplink transmission in a wireless communication system is provided. The method includes configuring an uplink control channel for transmission of a scheduling request in a subframe, the subframe comprising two consecutive slots, a slot comprising a plurality of single carrier-frequency division multiple access (SC-FDMA) symbols, the scheduling request being carried by presence or absence of transmission of the uplink control channel, and transmitting the scheduling request on the uplink control channel, wherein configuring the uplink control channel comprises dividing the plurality of SC-FDMA symbols in the slot into a first set of SC-FDMA symbols and a second set of SC-FDMA symbols, mapping each of first frequency domain sequences to each SC-FDMA symbol in the first set, the first frequency domain sequences being generated by cyclic shifts of a base sequence, mapping each of second frequency domain sequences to each SC-FDMA symbol in the second set, the second frequency domain sequence being generated by cyclic shifts of the base sequence, spreading the first frequency domain sequences in the first set with a first orthogonal sequence, the first orthogonal sequence having a length equal to the number of SC-FDMA symbols in the first set, and spreading the second frequency domain sequences in the second set with a second orthogonal sequence, the second orthogonal sequence having a length equal to the number of SC-FDMA symbols in the second set.

The two consecutive slots in the subframe may use different subcarriers. The length of the first frequency domain sequence and the length of the second frequency domain sequence may equal to the number of subcarriers in one SC-FDMA symbol.

In another aspect, a method of transmitting a scheduling request which is used to request a radio resource for uplink transmission in a wireless communication system is provided. The method includes configuring an uplink control channel for transmission of a scheduling request in a plurality of SC-FDMA symbols, the scheduling request being carried by presence or absence of transmission of the uplink control channel, and transmitting the scheduling request on the uplink control channel, wherein configuring the uplink control channel comprises dividing the plurality of SC-FDMA symbols into a first set of SC-FDMA symbols and a second set of SC-FDMA symbols, mapping each of first frequency domain sequences to each SC-FDMA symbol in the first set, the first frequency domain sequence being generated by cyclic shifts of a base sequence, mapping each of second frequency domain sequences to each SC-FDMA symbol in the second set, the second frequency domain sequence being generated by cyclic shifts of the base sequence, spreading the first frequency domain sequences in the first set with a first orthogonal sequence, the first orthogonal sequence having a length equal to the number of SC-FDMA symbols in the first set, and spreading the second frequency domain sequences in the second set with a second orthogonal sequence, the second orthogonal sequence having a length equal to the number of SC-FDMA symbols in the second set.

Advantageous Effects

A scheduling request can be transmitted without interference with a control channel transmitting another control signal, and thus the control channel can be effectively used.

MODE FOR THE INVENTION

Figure 1:
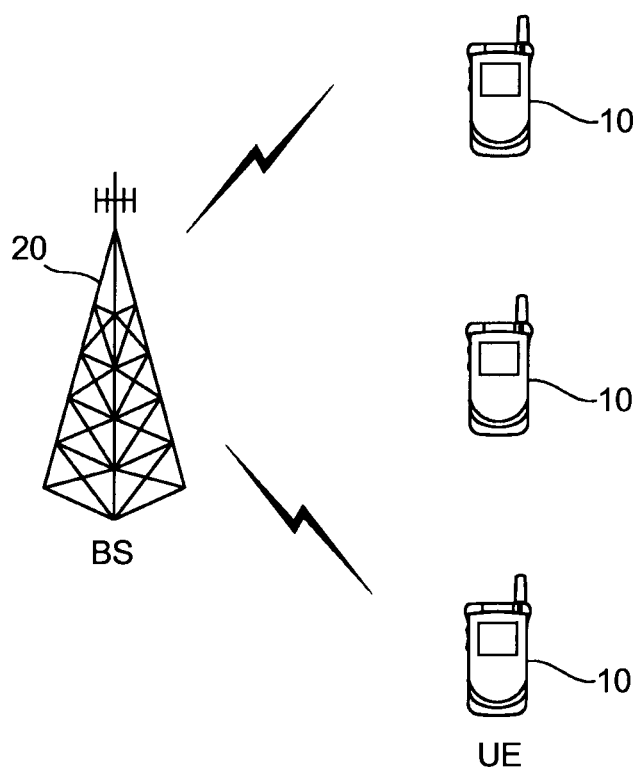
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, downlink is defined as communication from the BS 20 to the UE 10, and uplink is defined as communication from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Figure 2:
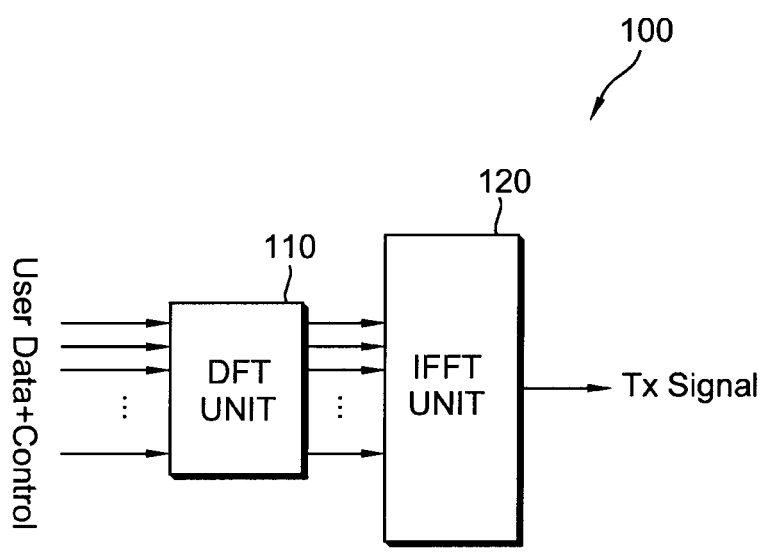
FIG. 2 is a block diagram of a transmitter according to an embodiment of the present invention.

FIG. 2 is a block diagram of a transmitter according to an embodiment of the present invention.

Referring to FIG. 2, a transmitter 100 includes a discrete Fourier transform (DFT) unit 110 that performs DFT and an Inverse fast Fourier transform (IFFT) unit 120 that performs IFFT. The DFT unit 110 performs DFT on data and outputs a frequency-domain symbol. The data input to the DFT unit 110 may be a control signal and/or user data. The IFFT unit 120 performs IFFT on the received frequency-domain symbol and outputs a transmit (Tx) signal. The Tx signal is a time-domain signal. A time-domain symbol output from the IFFT unit 120 is referred to as an orthogonal frequency division multiplexing (OFDM) symbol or a single carrier-frequency division multiple access (SC-FDMA) symbol. SC-FDMA is a scheme in which spreading is achieved by performing DFT in a previous stage of the IFFT unit 120. The SC-FDMA scheme is advantageous over an OFDM scheme in terms of decreasing a peak-to-average power ratio (PAPR).

Figure 3:
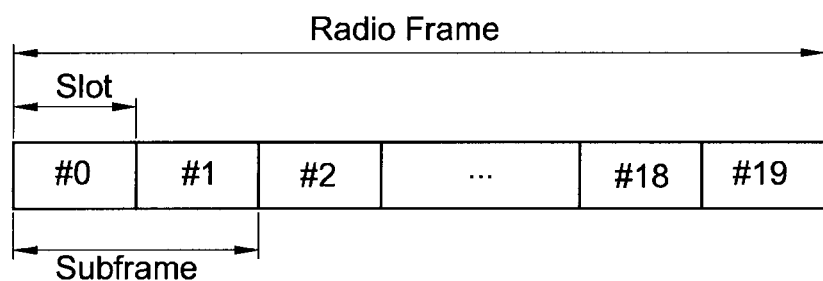
FIG. 3 shows an exemplary structure of a radio frame.

FIG. 3 shows an exemplary structure of a radio frame.

Referring to FIG. 3, the radio frame includes 10 sub-frames. One subframe includes two consecutive slots. One slot can include a plurality of OFDM symbols in a time domain and at least one subcarrier in a frequency domain. The slot is a unit of radio resource allocation in the time domain. For example, one slot can include 7 or 6 OFDM symbols.

The radio frame structure is shown for exemplary purposes only, and thus the number of subframes included in the radio frame or the number of slots included in the subframe or the number of SC-FDMA symbols included in the slot may change variously.

Figure 4:
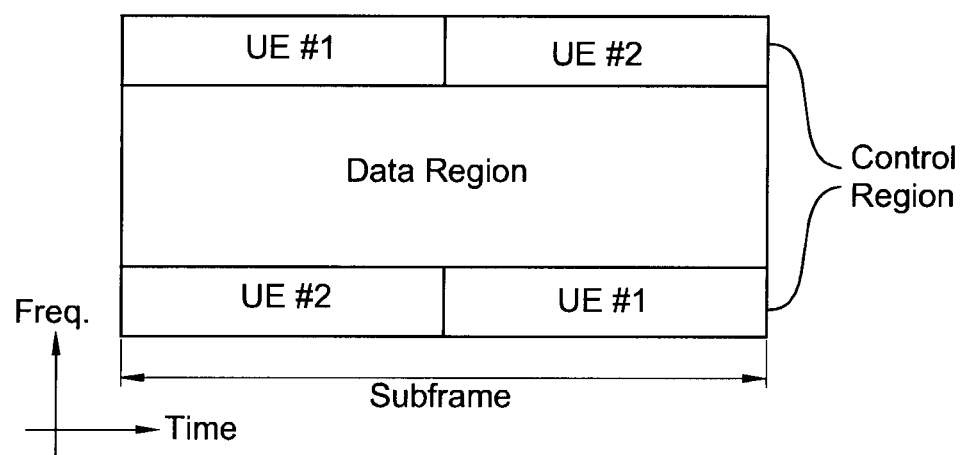
FIG. 4 shows an exemplary structure of a subframe.

FIG. 4 shows an exemplary structure of a subframe. The subframe may be an uplink subframe.

Referring to FIG. 4, the subframe can be divided into two parts, i.e., a control region and a data region. Since the control region and the data region use different frequency bands, frequency division multiplexing (FDM) has been achieved. The control region is a region allocated with a control channel. The data region is a region allocated with a data channel. The control channel may use one resource block in each of two slots in a subframe. A resource block includes a plurality of subcarriers. The control channel is a channel for transmitting a control signal. The data channel is a channel for transmitting the control signal and/or user data. The control channel is referred to as a physical uplink control channel (PUCCH). The data channel is referred to as a physical uplink shared channel (PUSCH). The control signal may have various types, such as, an acknowledgement (ACK)/negative-acknowledgement (NACK) signal, a channel quality indicator (CQI), a precoding matrix index (PMI), a rank indicator (RI), a scheduling request, etc.

The control channel transmits only the control signal. The data channel can transmit the user data together with the control signal. According to a single subcarrier property, one LIE cannot transmit the control channel and the data channel simultaneously.

The control channel can be frequency-hopped in a slot unit on a subframe. The control channel uses different subcarriers for each slot on the subframe. A frequency diversity gain can be obtained by transmitting the control channel through slots allocated to different frequency bands. It will be assumed that one subframe consists of a 1st slot and a 2nd slot. In addition, the 1st slot is divided into a 1st region and a 2nd region in a frequency domain, and the 2nd slot is divided into a 1st region and a 2nd region in the frequency region. Then, the control signal is transmitted through the 1st region of the 1st slot and the 2nd region of the 2nd slot within one subframe.

Now, a structure of an uplink control channel will be described.

Frequency spreading and two-dimensional spreading of time-domain covering can be applied to the uplink control channel. A reference signal can be defined for coherent detection.

For clear explanation, it will be assumed hereinafter that one slot consists of 7 OFDM symbols, and thus one subframe including two slots consists of 14 SC-FDMA symbols in total. The number of SC-FDMA symbols included in one subframe or the number of SC-FDMA symbols included in one slot is shown for exemplary purposes only, and thus the technical scope of the present invention is not limited thereto.

Figure 5:
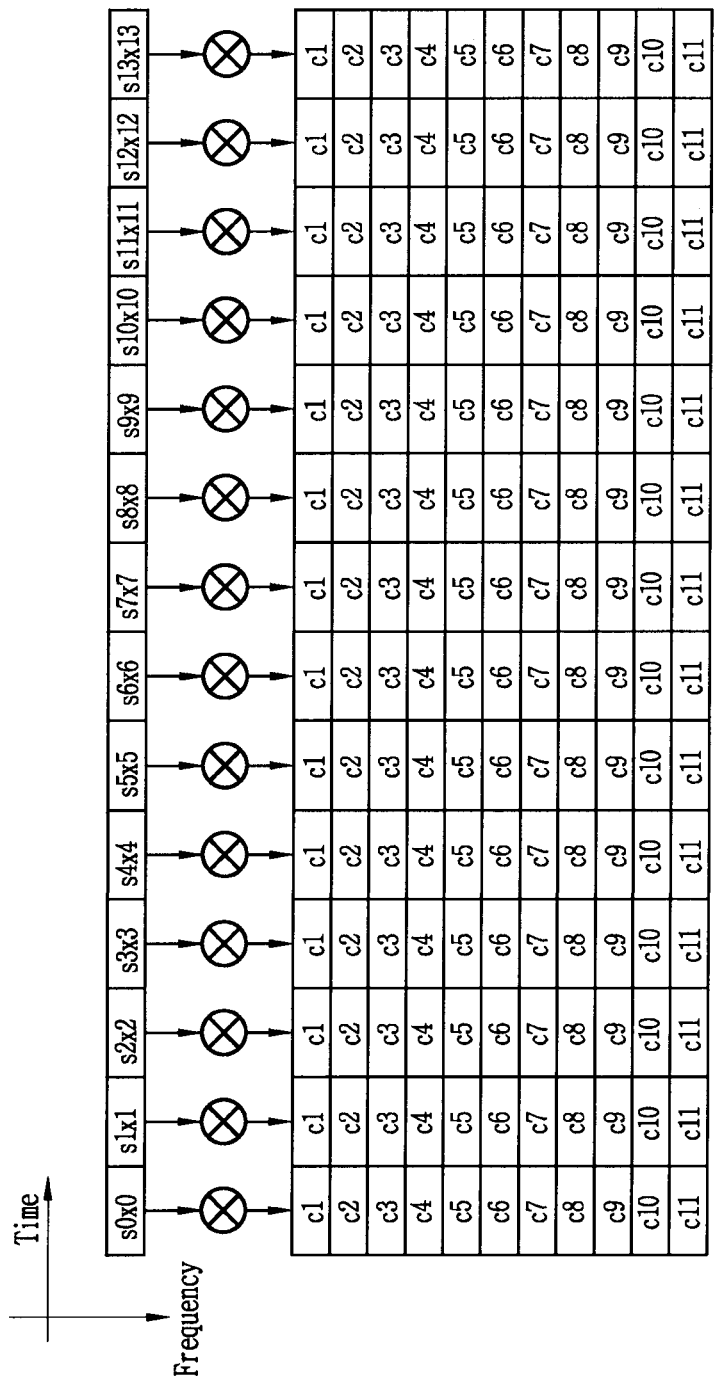
FIG. 5 shows an exemplary structure of a control channel in case of using two-dimensional spreading.

FIG. 5 shows an exemplary structure of a control channel in case of using two-dimensional spreading.

Referring to FIG. 5, {s0, s1, . . . , s13} denotes a control signal sequence for SC-FDMA symbols, and {x0, x1, . . . , x13} denotes a time-domain sequence for SC-FDMA symbols. The time-domain sequence for time-domain spreading may use a well-known orthogonal sequence such as a Walsh code. {c0, c1, . . . , c11} denotes a frequency-domain sequence for frequency-domain spreading. The time-domain sequence is a sequence whose elements correspond to SC-FDMA symbols. The frequency-domain sequence is a sequence whose elements correspond to subcarriers.

A Zadoff-Chu (ZC) sequence is one example of a constant amplitude zero auto-correlation (CAZAC) sequence and is used as the frequency-domain sequence. A ZC sequence c(k) with a length of N can be generated as shown below:

MathFigure 1

$$c(k) = \begin{cases} e^{-j\frac{\pi M k(k+1)}{N}} & \text{for odd } N \\ e^{-j\frac{\pi M k^2}{N}} & \text{for even } N \end{cases} \quad [\text{Math. 1}]$$

where $0 \leq k \leq N-1$, and M is a root index and is a natural number equal to or less than N, where N is a relatively prime number to M. This means that, once N is determined, the number of root indices is equal to the number of available ZC sequences. ZC sequences having different cyclic shift values are orthogonal to each other. Therefore, from a ZC sequence generated using one root index, a plurality of orthogonal sequences can be obtained through cyclic shift.

The ZC sequence is for exemplary purposes only. Thus, other sequences having an excellent correlation characteristic can also be used as the frequency-domain sequence.

The frequency-domain sequence can be undergone cyclic shift hopping for each SC-FDMA symbol. That is, although each SC-FDMA is spread through the same frequency-domain sequence in FIG. 5, each SC-FDMA can also be spread through a frequency-domain sequence having a different cyclic shift value. This is called cyclic shift hopping.

When the cyclic shift hopping is carried out, a control channel characteristic can be prevented from rapid deterioration caused by a high correlation at a specific cyclic shift value.

Figure 6:
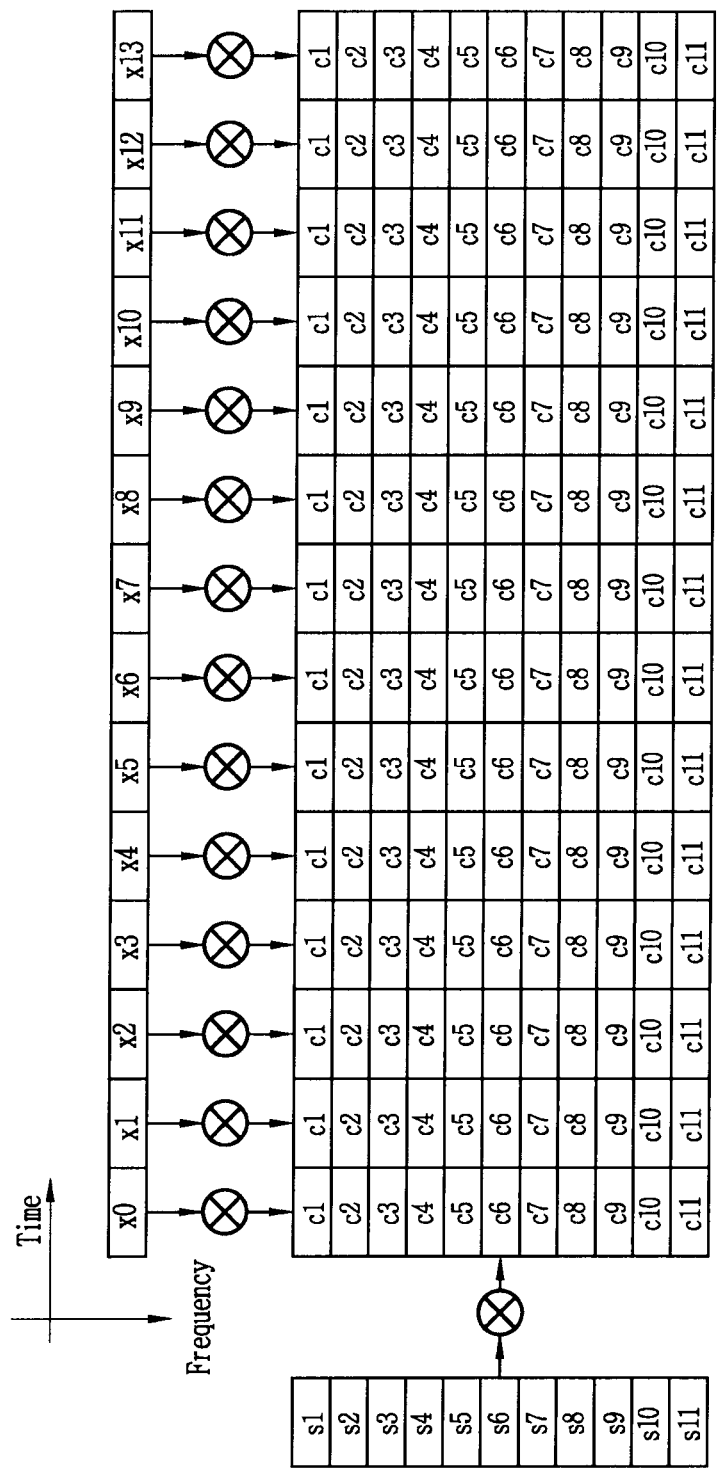
FIG. 6 shows another exemplary structure of a control channel in case of using two-dimensional spreading.

FIG. 6 shows another exemplary structure of a control channel in case of using two-dimensional spreading.

Referring to FIG. 6, unlike the example of FIG. 5, a control signal sequence {s0, s1, . . . , s13} is spread over a frequency domain.

Now, a method of generating a scheduling request channel for transmitting a scheduling request will be described.

The scheduling request is used when a UE requests a BS to allocate an uplink radio resource. The scheduling request is a sort of preliminary information exchange for exchanging uplink data. In order for the UE to transmit uplink data to the BS, the uplink radio resource has to be first requested through the scheduling request. When the UE transmits the scheduling request on an uplink control channel, the BS transmits the allocated uplink radio resource to the UE on a downlink control channel. The uplink control channel for transmitting the scheduling request is referred to as a scheduling request channel.

Examples of a method of generating the scheduling request channel include a method in which a channel (i.e., an ACK/NACK channel or a CQI channel) for transmitting different control signals are reserved for the scheduling request and a method in which a dedicated channel is assigned for the scheduling request. In the former method, the channel is generated simultaneously with a different control channel, and compatibility with a different control signal needs to be maintained. Although the time-frequency resource is shared with the different control signal, the scheduling request can be identified by using a different sequence. In the latter method, a new time-frequency resource is allocated to transmit the scheduling request.

First, a method of transmitting a scheduling request signal by using an ACK/NACK channel and a CQI channel will be described. However, technical features of the present invention are not limited to the ACK/NACK channel or the CQI channel. Thus, the preset invention can be widely used in a control channel having a structure in which a second control signal (e.g., the scheduling request) can be transmitted on the control channel for transmitting a first control signal (e.g., the ACK/NACK signal, the CQI, etc.).

Figure 7:
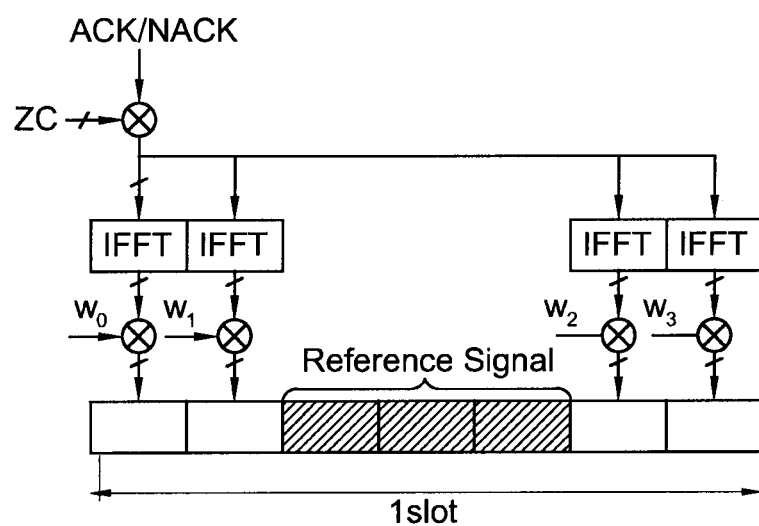
FIG. 7 shows a structure of an acknowledgement (ACK)/negative-acknowledgement (NACK) channel.

FIG. 7 shows a structure of an ACK/NACK channel. The ACK/NACK channel is a control channel on which an ACK/NACK signal is transmitted. The ACK/NACK signal is a reception confirm signal for downlink data for hybrid automatic repeat request (HARQ). When the control signal is transmitted within a pre-assigned band, frequency-domain spreading and time-domain spreading are simultaneously performed to increase the number of multiplexible UEs and the number of control channels.

Referring to FIG. 7, among 7 SC-FDMA symbols included in one slot, a reference signal (or simply RS) is carried on 3 consecutive SC-FDMA symbols in the middle portion of the slot and the ACK/NACK signal is carried on the remaining 4 SC-FDMA symbols. The RS is carried on the 3 consecutive SC-FDMA symbols located in the middle portion of the slot. The position and the number of symbols used in the RS may vary, and as a result, the position and the number symbols used in the ACK/NACK signal may also change.

A frequency-domain sequence is used to spread the ACK/NACK signal on a frequency domain. The aforementioned ZC sequence may be used as the frequency-domain sequence. ACK/NACK channels can be identified by using ZC sequences each having a different cyclic shift value. The number of available cyclic shifts may vary depending on channel delay spreading.

The ACK/NACK signal is spread in a frequency domain and is then subjected to IFFT processing. Thereafter, the ACK/NACK signal is spread again in a time domain by using a time-domain sequence (or an orthogonal sequence). The ACK/NACK signal is spread using 4 time-domain spreading codes $w_0$, $w_1$, $w_2$, and $w_3$ for 4 OFDM symbols. The reference signal is also spread using an orthogonal sequence with a length of 3.

Although it has been described that the frequency-domain spreading is performed before the time-domain spreading is performed, this is for exemplary purposes only. Thus, the present invention is not limited to the order of performing the frequency-domain spreading and the time-domain spreading. The time-domain spreading may be performed before the frequency-domain spreading is performed. The time-domain spreading and the frequency-domain spreading may be simultaneously performed by using a sequence having one combined format.

Figure 8:
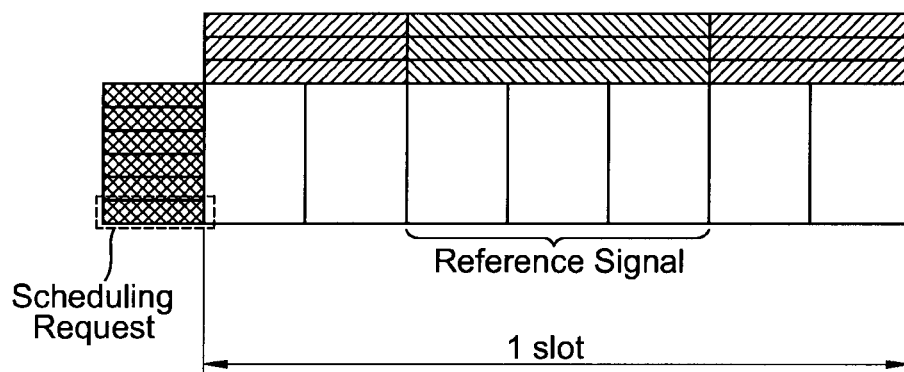
FIG. 8 shows an exemplary structure of an ACK/NACK channel on which a scheduling request is transmitted.

FIG. 8 shows an exemplary structure of an ACK/NACK channel on which a scheduling request is transmitted. This is a case where at least one cyclic shift is reserved with the scheduling request in the ACK/NACK channel structure.

Referring to FIG. 8, in the ACK/NACK channel, ZC sequences maintain orthogonality with each other by using cyclic shifts, and one of the cyclic shifts is reserved by transmitting the scheduling request.

For example, if a total of 6 cyclic shifts can be used, one cyclic shift is used in transmission of the scheduling request. The number of possible cyclic shifts may vary, and two or more cyclic shifts may be reserved to transmit the scheduling request.

If a specific cyclic shift is used to transmit the scheduling request in the ACK/NACK channel, the ACK/NACK signal is transmitted using a cyclic shift unused in the transmission of the scheduling request.

If a reserved cyclic shift is used for the scheduling request, time-domain covering can be used for each SC-FDMA symbol in a time domain. In this case, for coherent detection, the number of times of performing time-domain spreading depends on min(the number of SC-FDMA symbols of an ACK/NACK signal, the number of SC-FDMA symbols of a reference signal). In the coherent detection, a constellation of a Tx signal (i.e., the ACK/NACK signal) is identified according to a defined reference signal. Since the number of SC-FDMA symbols of the ACK/NACK signal is 4 and the number of SC-FDMA symbols of the reference signal is 3, the time-domain spreading can be performed up to 3 times for the coherent direction. Therefore, if one cyclic shift is used as a scheduling request signal for the ACK/NACK channel in the coherent detection, a maximum of 3 scheduling request channels can be transmitted for each slot.

Although it has been described that the number of root indices of ZC sequences usable in one cell is one, more UEs can transmit the scheduling request when the number of root indices increases.

Cyclic-shift hopping may be used in a cyclic shift for the scheduling request channel. If the cyclic-shift hopping is used for each SC-FDMA symbol, a hopping pattern can be reserved in advance to be used.

The scheduling request channel is defined herein by using a cyclic shift when a ZC sequence is used as a frequency-domain spreading code in the ACK/NACK channel. However, if another sequence is used as the frequency-domain sequence, the scheduling request channel may be defined by reserving a part of a corresponding sequence set or by reserving a hopping pattern of the sequence.

Figure 9:
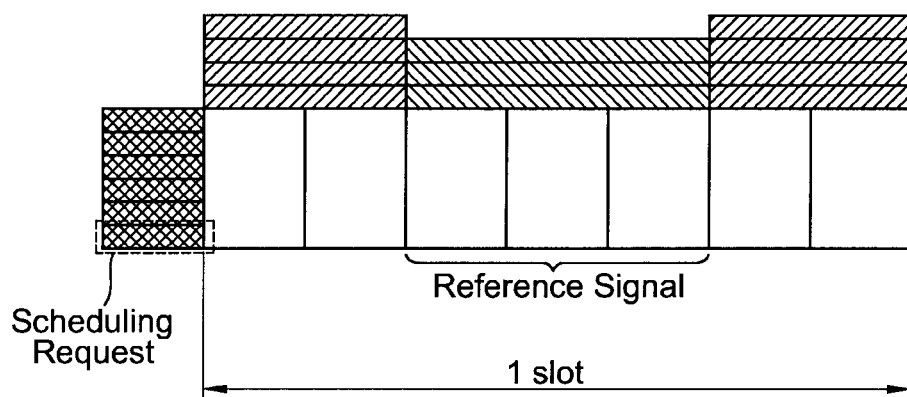
FIG. 9 shows another exemplary structure of an ACK/NACK channel on which a scheduling request is transmitted.

FIG. 9 shows another exemplary structure of an ACK/NACK channel on which a scheduling request is transmitted. This structure supports both cases of with and without the use of a reference signal.

Referring to FIG. 9, the number of SC-FDMA symbols of an ACK/NACK signal and the number of SC-FDMA symbols of a reference signal are compared, and a greater value of the two is defined as the number of times of performing time-domain spreading usable for each cyclic shift. When the number of times of performing time-domain spreading of the control signal is different from the number of times of performing time-domain spreading of the reference signal, a smaller value of the two is used for coherent detection, and the other value is used for non-coherent detection.

When the number of the SC-FDMA symbols of the control signal is 4 and the number of the SC-FDMA symbols of the reference signal is 3, the control signal has 4 time-domain spreading codes and the reference signal has 3 time-domain spreading codes. If the non-coherent detection is used, 4 time-domain sequences can be used as a spreading code. Three of the four time-domain sequences may be transmitted using non-coherent detection, and the remaining one may be transmitted using coherent detection.

Figure 10:
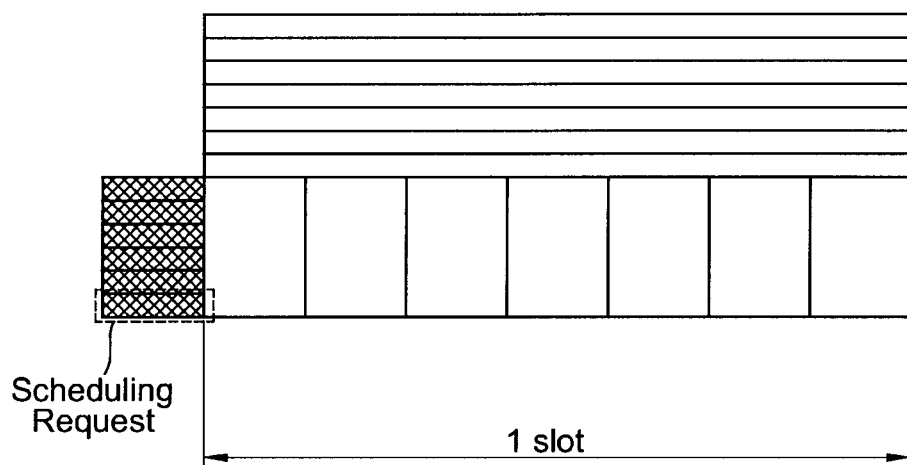
FIG. 10 shows another exemplary structure of an ACK/NACK channel on which a scheduling request is transmitted.

FIG. 10 shows another exemplary structure of an ACK/NACK channel on which a scheduling request is transmitted. This is a case where non-coherent detection is used.

Referring to FIG. 10, since there is no need to transmit a reference signal in non-coherent detection, sequences can be used in time-domain spreading, wherein the number of sequences corresponds to the number of all available SC-FDMA symbols. When the number of SC-FDMA symbols for each slot is 7, a length of a time-domain sequence is 7 and the number of all time-domain sequences is also 7.

Figure 11:
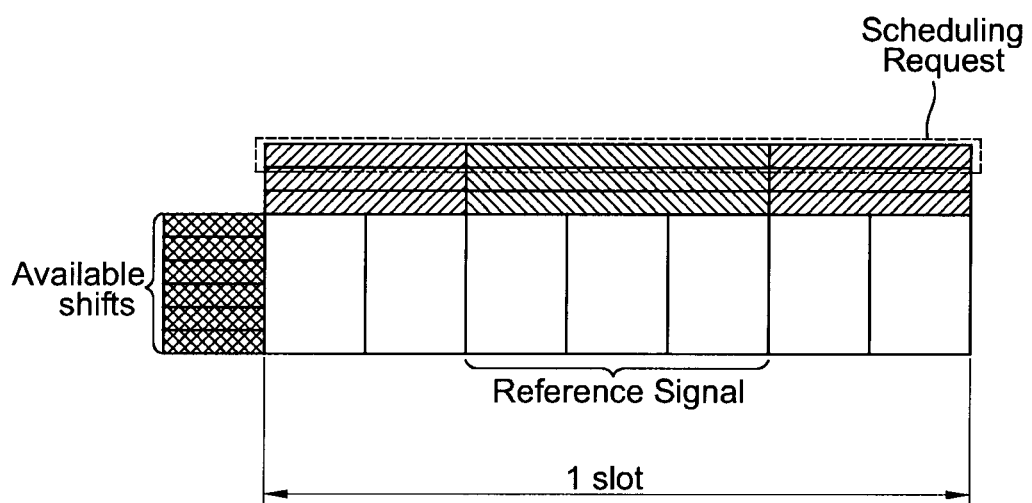
FIG. 11 shows another exemplary structure of an ACK/NACK channel on which a scheduling request is transmitted.

FIG. 11 shows another exemplary structure of an ACK/NACK channel on which a scheduling request is transmitted. A time-domain sequence is reserved in the ACK/NACK channel and is used as a scheduling channel.

Referring to FIG. 11, at least one of time-domain sequences is reserved as a scheduling request channel for transmitting a scheduling request. A time-domain sequence with a length of 7 is used as the scheduling request channel. The scheduling request may be transmitted using an unused portion in a time-domain sequence of a control signal or a time-domain sequence of a reference signal.

As for a frequency-domain sequence, the same frequency-domain sequence of the control signal such as the ACK/NACK signal may be used. Another specific sequence may be dedicatedly used for the scheduling request.

The ACK/NACK signal and the scheduling request may be identified through a divided time-domain sequence. That is, a frequency-domain sequence assigned for ACK/NACK signal transmission is also used for the scheduling request, and the scheduling request and the ACK/NACK signal are identified through the time-domain sequence. In addition, when the same time-domain sequence is used for both the ACK/NACK signal and the scheduling request, the ACK/NACK signal and the scheduling request may be identified by assigning different frequency-domain sequences to the ACK/NACK signal and the scheduling request.

For example, in case of supporting coherent detection, a maximum of 3 time-domain sequences are present for 3 reference signals. At lease one of the three time-domain sequences is assigned to a scheduling request channel. In addition, a control signal's time-domain sequence associated with a reference signal's time-domain sequence assigned to the scheduling request channel may be assigned to another scheduling request channel. The scheduling request channel supports coherent detection.

Figure 12:
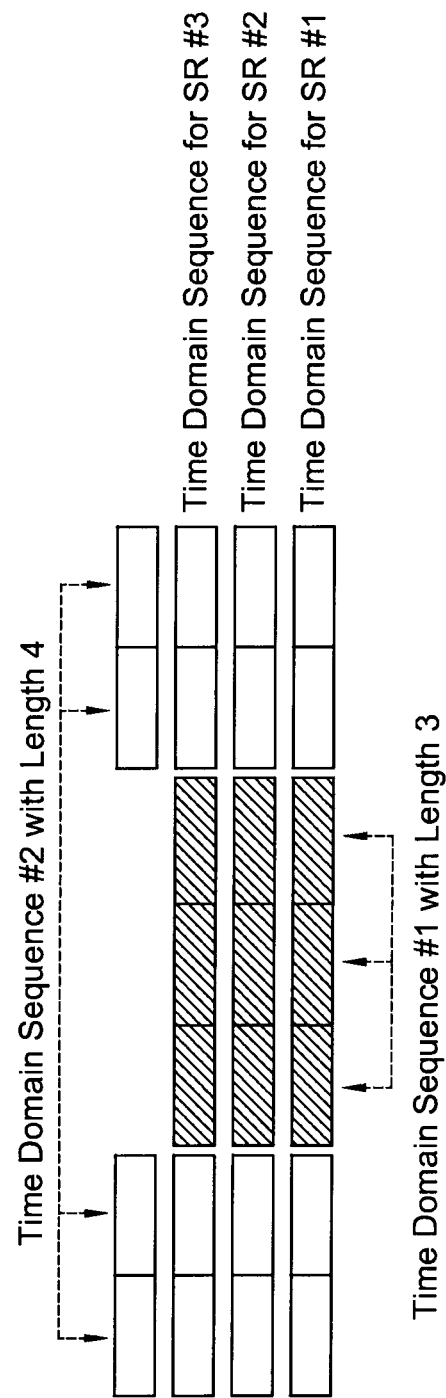
FIG. 12 shows another exemplary structure of an ACK/NACK channel on which a scheduling request is transmitted.

FIG. 12 shows another exemplary structure of an ACK/NACK channel on which a scheduling request is transmitted. This is a case where time-domain sequences are reserved for the ACK/NACK channel, wherein a time-domain sequence with a length of 3 and a time-domain sequence with a length of 4 are both used.

Referring to FIG. 12, in the ACK/NACK channel, a scheduling request channel is configured by spreading the time-domain sequence with a length of 3 in a reference signal region and the time-domain sequence with a length of 4 in a data region (i.e., an ACK/NACK signal part).

Figure 13:
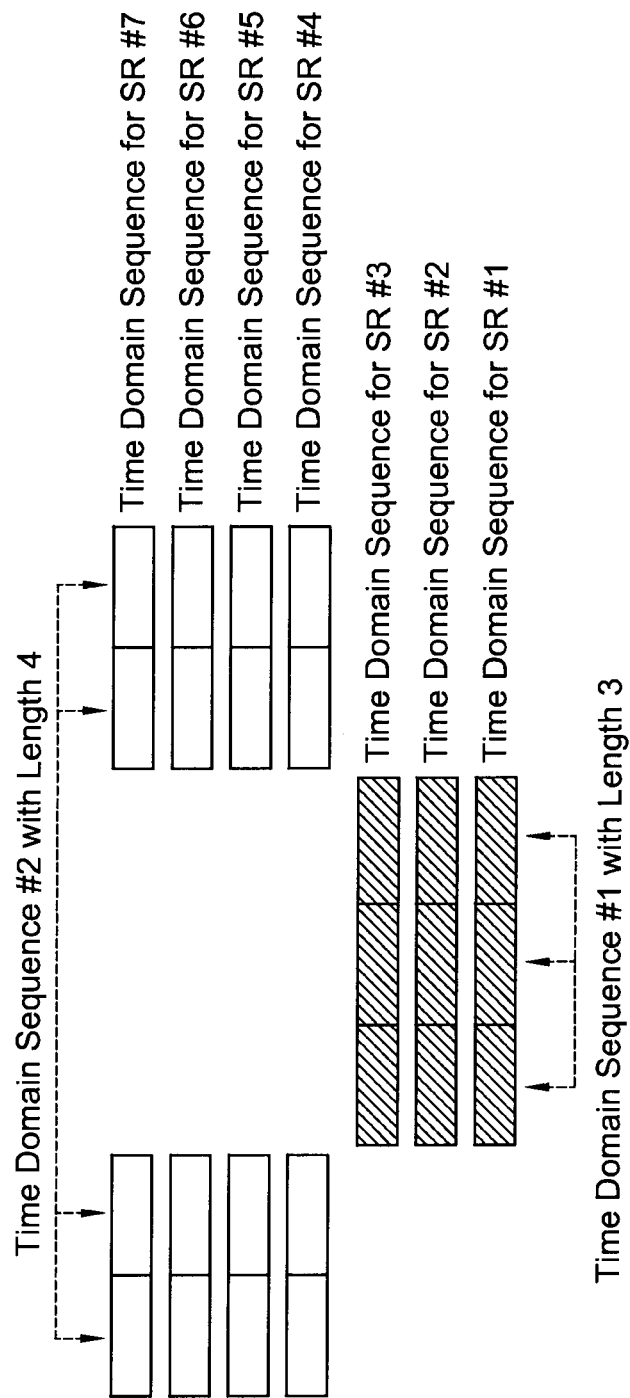
FIG. 13 shows another exemplary structure of an ACK/NACK channel on which a scheduling request is transmitted.

FIG. 13 shows another exemplary structure of an ACK/NACK channel on which a scheduling request is transmitted. This is a case where time-domain sequences are reserved for the ACK/NACK channel, wherein a time-domain sequence with a length of 3 and a time-domain sequence with a length of 4 are separately used.

Referring to FIG. 13, in the ACK/NACK channel, the time-domain sequence with a length of 3 is used as a scheduling request channel in a reference signal region, and the time-domain sequence with a length of 4 is used as a scheduling request channel in a data region (i.e., an ACK/NACK signal part). By using two types of time-domain sequences for the scheduling request channel, a maximum of 7 scheduling request channels can be configured. In comparison with the example of FIG. 12, UE capability increases.

In addition, a combination of the example of FIG. 12 and the example of FIG. 13 can also be used. As described above, in the example of FIG. 12, the time-domain sequence with a length of 3 and the time-domain sequence with a length of 4 are simultaneously used in the time domain, and in the example of FIG. 13, the time-domain sequence with a length of 3 and the time-domain sequence with a length of 4 are separately used.

Figure 14:
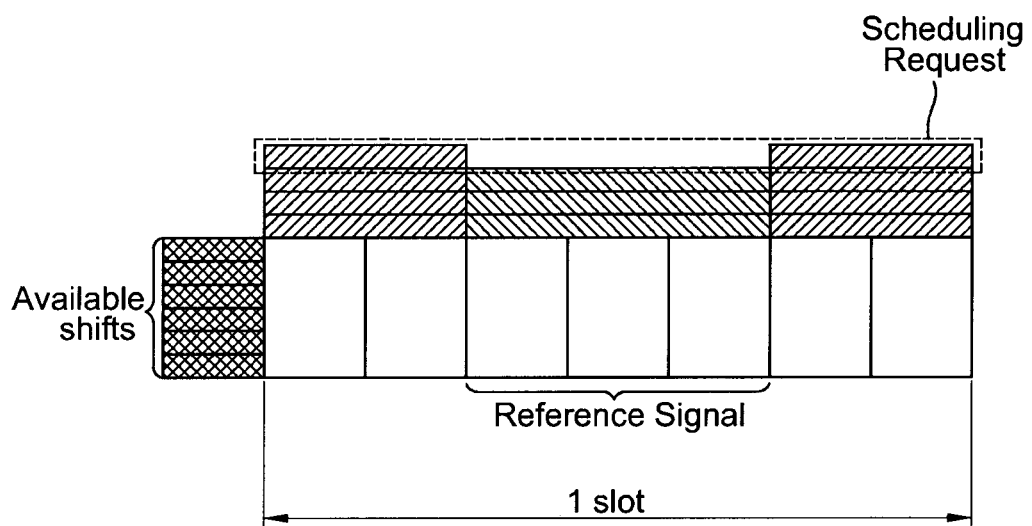
FIG. 14 shows another exemplary structure of an ACK/NACK channel on which a scheduling request is transmitted.

FIG. 14 shows another exemplary structure of an ACK/NACK channel on which a scheduling request is transmitted. This is a case where a time-domain sequence is reserved for the ACK/NACK channel to be used as a scheduling channel. Non-coherent detection is used herein.

Referring to FIG. 14, in case of supporting non-coherent detection, at least one of time-domain sequences with a length of 4 is assigned to a scheduling request channel. The four time-domain sequences correspond to four SC-FDMA symbols. Unused time-domain sequences of a remaining reference signal portion can be assigned to other scheduling request channels. That is, by identifying a time-domain sequence of a control signal from a time-domain sequence of a reference signal, the time-domain domain sequences are assigned to scheduling request channels supporting non-coherent detection. In case of supporting coherent detection, a time-domain spreading code of the control signal and a time-domain spreading code of the reference signal have to be paired to be transmitted simultaneously.

Figure 15:
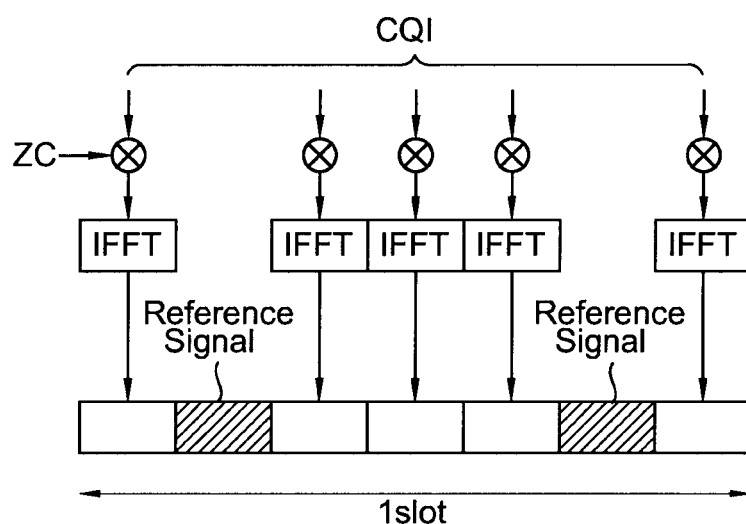
FIG. 15 shows a structure of a channel quality indicator (CQI) channel.

FIG. 15 shows a structure of a CQI channel. The CQI channel is a control channel for transmitting a CQI. To ensure a sufficient symbol space, time-domain spreading is not used in CQI transmission.

Referring to FIG. 15, among 7 SC-FDMA symbols included in one slot, a reference signal is carried on 2 SC-FDMA symbols spaced apart from each other by 3 SC-FDMA symbols, and the CQI is carried on the remaining 5 SC-FDMA symbols. This is for exemplary purposes only, and thus the position and the number of SC-FDMA symbols used in the reference signal or the position or the number of symbols used in the CQI may vary. When quadrature phase shift keying (QPSK) mapping is performed on one SC-FDMA symbols, a 2-bit CQI value can be carried. Therefore, a 10-bit CQI value can be carried on one slot. For one subframe, a maximum 20-bit CQI value can be carried. In addition to the QPSK, the CQI may use other modulation schemes, e.g., 16-quadrature amplitude modulation (QAM).

The CQI is spread over a frequency domain by using a frequency-domain sequence. The frequency-domain sequence may be a ZC sequence. Unlike the two-dimensional spreading in the ACK/NACK channel, the CQI channel uses only one-dimensional spreading and thus increases CQI transmission capacity. Although only the frequency-domain spreading is described herein as an example, the CQI channel may also use time-domain spreading.

In the CQI channel, cyclic shifts can be reserved to be assigned to a scheduling request channel. This is the same as the example of the ACK/NACK channel except for a difference in the number of SC-FDMA symbols of the reference signal. Unlike the ACK/NACK channel, in the CQI channel, in many cases, a less number of SC-FDMA symbols are assigned to the reference signal. This is because spreading is not necessary over a time axis since users can be identified with sequence identification on a frequency axis. Therefore, a function of the reference signal can be achieved with only at least one SC-FDMA symbol. In case of a high Doppler effect, about 2 SC-FDMA symbols may be assigned to the reference signal, but it is difficult to use time-domain spreading.

A time-domain sequence can be defined in order to define the scheduling request channel. In case of supporting coherence detection, similarly to the ACK/NACK channel structure, about 3 SC-FDMA symbols are assigned to the reference signal, and a control signal part and a reference signal part may be identified when transmitted. In case of supporting non-coherent detection, a time-domain spreading code can be defined using a long sequence with a total length of one slot. Also in this case, similarly to the ACK/NACK channel, a sequence set of mutually orthogonal sequences such as a cyclic shift of a ZC sequence can be defined to be used as a time-domain spreading code. The sequence set may be a set of sequences whose mutual cross-correlation is small.

Although it has been described above that the scheduling request channel is configured to have a compatibility with a structure of the ACK/NACK channel or the CQI channel, the scheduling request channel can be configured by reserving a new time-frequency resource. In case of configuring a dedicated scheduling request channel, non-coherent detection not requiring the reference signal may be used. This is because the scheduling request can be transmitted according to a presence/absence of transmission of the scheduling request channel since the scheduling request can be identified only with a presence/absence of the scheduling request channel. For example, transmission of the scheduling request channel can be regarded as transmission of the scheduling request. In addition, the presence/absence of the scheduling request can be toggled according to the presence/absence of the scheduling request channel.

Figure 16:
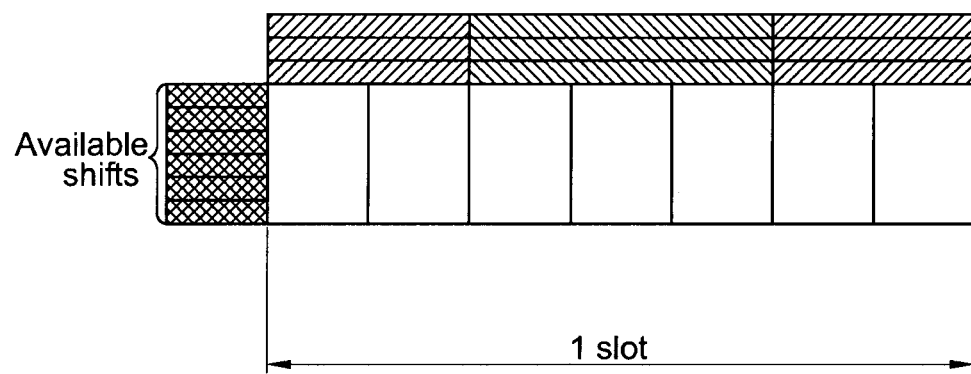
FIG. 16 shows an example of a scheduling request channel.

FIG. 16 shows an example of a scheduling request channel.

Referring to FIG. 16, when the scheduling request channel is generated independently from other control channels, its design is not related to the control channels. Thus, in this case, an arbitrary structure can be selected. In addition, unlike a case where a scheduling request channel is configured to be compliant with a conventional control channel, all control channels can be used. Thus, UE capability for the scheduling request channel increases.

Similarly to the ACK/NACK channel, the scheduling request channel is configured by using two-dimensional spreading of a frequency domain and a time domain. That is, a slot is divided into two parts, and a first time-domain spreading is performed on a first part and a second time-domain spreading is performed on a second part. In other words, for 4 SC-FDMA symbols (i.e., a first set) corresponding to a data part of the conventional ACK/NACK channel with respect to one slot, a first frequency-domain sequence is mapped onto each SC-FDMA symbol. In this case, the first frequency-domain sequence may have the same cyclic shift for each SC-FDMA symbol belonging to the first set or may have different cyclic shifts. The first frequency-domain sequence is spread again through a first orthogonal sequence, that is, a time-domain sequence. In addition, for 3 SC-FDMA symbols (i.e., a second set) corresponding to a reference signal part of the conventional ACK/NACK channel with respect to one slot, a first frequency-domain sequence is mapped onto each SC-FDMA symbol. In this case, the second frequency-domain sequence may have the same cyclic shift for each SC-FDMA symbol belonging to the second set or may have different cyclic shifts. The second frequency-domain sequence is spread again through a second orthogonal sequence, that is, a time-domain sequence.

In the frequency-domain spreading and the time-domain spreading, different sequences may be used for each SC-FDMA symbol or each slot. That is, a cyclic shift of a frequency-domain sequence may change for each SC-FDMA symbol and/or for each slot. A method of using an independent scheduling request channel or a method of sharing the scheduling request channel with a different control channel may be used in combination. Information related to configuration of the scheduling request channel may be reported by the BS to the UE through a broadcast channel or the like. In a method of mapping resources for the scheduling request channel onto actual UEs, a range of a UE identifier (ID) may be determined so that UE IDs are mapped to resources for the scheduling request channel in a 1:1 manner according to the determined order. Although the scheduling request channel can be generated in every transmission time interval (TTI), waste of radio resources can be reduced by regulating a period generated according to an amount of radio resource usable in the scheduling request channel.

Figure 17:
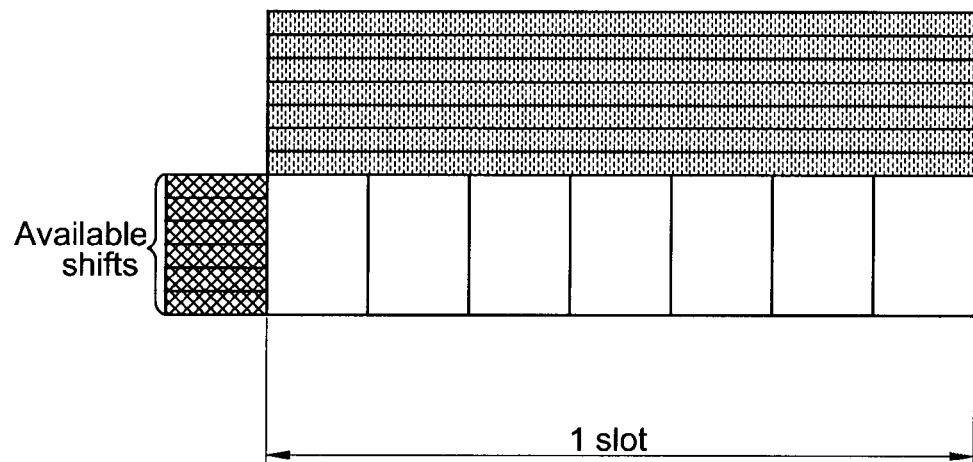
FIG. 17 shows an example of a scheduling request channel.

FIG. 17 shows an example of a scheduling request channel. This is a case where non-coherent detection is supported.

Referring to FIG. 17, in case of supporting non-coherent detection, time-domain spreading is carried out through a time-domain sequence with a length of 7 corresponding to one slot.

Figure 18:
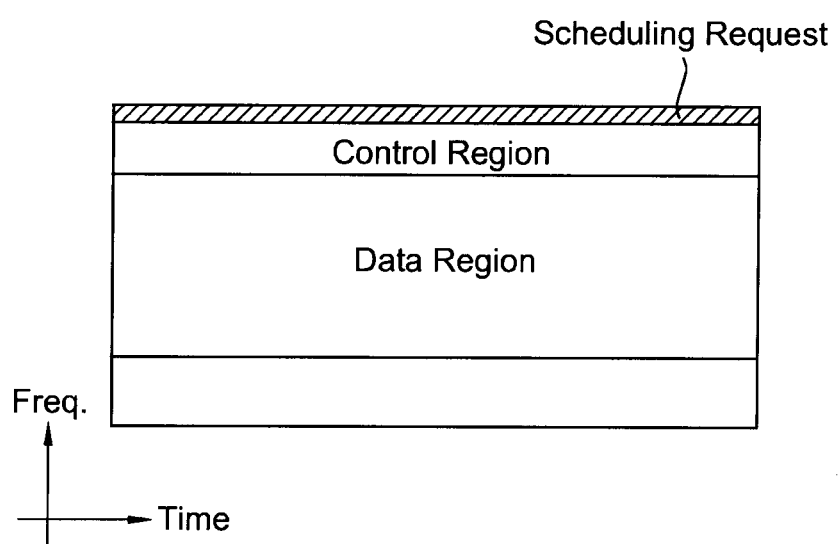
FIG. 18 shows an example of resource allocation for a scheduling request channel.
Figure 19:
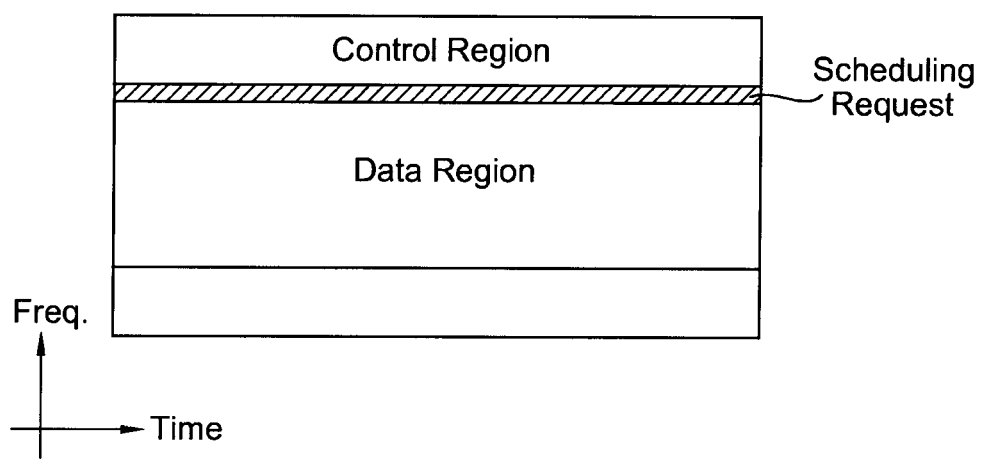
FIG. 19 shows another example of resource allocation for a scheduling request channel.

FIG. 18 shows an example of resource allocation for a scheduling request channel. A radio resource for the scheduling request channel is assigned to an outermost portion of a control region. FIG. 19 shows another example of resource allocation for a scheduling request channel. A radio resource for the scheduling request channel is assigned between a control region and a data region. The scheduling request channel may be assigned to a data region or may be assigned either one of the control region or the data region.

Figure 20:
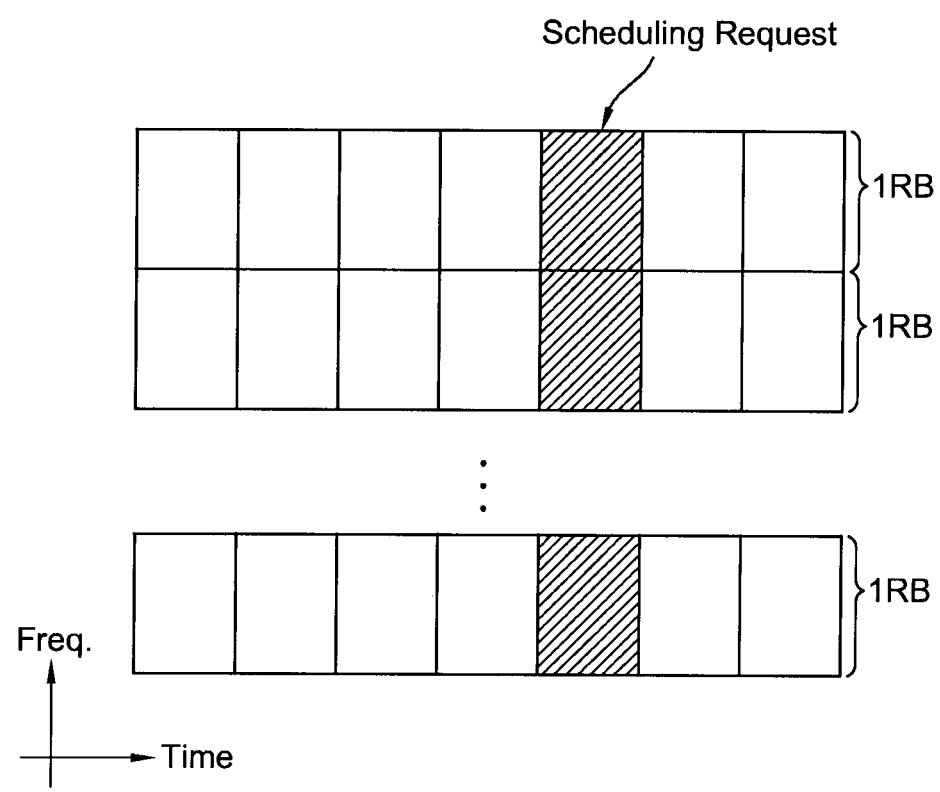
FIG. 20 shows another example of resource allocation for a scheduling request channel.

FIG. 20 shows another example of resource allocation for a scheduling request channel.

Referring to FIG. 20, the scheduling request channel is assigned to at least one SC-FDMA symbol. A resource block (or simply RB) is a unit of frequency domain resource allocation and includes a plurality of subcarriers. The scheduling request channel can be transmitted throughout the entire band similar to a sounding signal for uplink radio resource scheduling. The scheduling request channel may be transmitted alternately or simultaneously with the sounding signal.

In the scheduling request channel, resources can be allocated in a unit of resource blocks. A sequence used in each resource block may be a ZC sequence used in a control channel combined with a cyclic shift. In this case, a predetermined number of scheduling request channels can be configured, wherein the predetermined number corresponds to N cyclic shifts×X resource blocks.

One SC-FDMA symbol is used for a scheduling request channel. In detail, the scheduling request channel may be configured with one resource block, and a UE may be identified according to a sequence in use and a position of a resource block in use.

Instead of allocating all resource blocks to the scheduling request channel, some of the resource blocks may be allocated to the data channel.

Radio resource allocation information on the scheduling request channel can be reported by the BS through the broadcast channel. A scheduling request signal may be periodically transmitted by the UE or may be transmitted in an event-driven manner. A transmission period of a scheduling request may be reported by the BS to the UE.

A method of transmitting uplink data through a scheduling request related to uplink data transmission will now be described. A UE receives radio resource allocation information regarding a scheduling request channel from a BS. The scheduling request channel is an uplink control channel and is different from a random access channel which is used before synchronization between the BS and the UE is achieved yet. The UE configures the scheduling request channel by using the radio resource allocation information and transmits the scheduling request to the BS on the scheduling request channel. The BS transmits an uplink radio resource allocated according to the scheduling request to the UE on a downlink control channel. The UE transmits the uplink data by using the uplink radio resource.

A method of transmitting a scheduling request on a scheduling request channel is classified into non-coherent detection and coherent detection. However, the scheduling request can be detected in practice in more various manners. A method of analyzing the scheduling request by determining a presence/absence of a signal and a method of identifying the scheduling request by using modulated signal information may also be taken into consideration.

In the non-coherent detection, a presence/absence of a scheduling request is determined according to a presence/absence of transmission of a scheduling request channel. In the coherent detection, all UEs transmit scheduling request signals when scheduling request channels are allocated to the UEs. When binary phase shift keying (BPSK) modulation is used, a UE may transmit 1-bit information indicating whether a scheduling request is desired or not. When quadrature phase shift keying (QPSK) modulation is used, the UE may transmit additional 1-bit information together with the 1-bit information indicating whether the scheduling request is desired or not. In this case, the additionally transmitted information may be quality of service (QoS) information or buffer size information for facilitating a scheduling process.

Coherence detection and non-coherent detection can be used at the same time. This is referred to as partial coherent detection. In the partial coherent detection, only a UE desiring a scheduling request transmits the scheduling request rather than all UEs unconditionally transmit scheduling requests. The UE transmitting the scheduling request may transmit additional desired information. When the UE does not need scheduling, that is, when the UE does not require radio resource for uplink transmission, the UE ignores the scheduling request instead of transmitting the scheduling request. Then, a receiver first determines a presence/absence of the scheduling request according to a presence/absence of a signal. If the signal exists, it is determined that there is the scheduling request. In a case where a transmitter transmits the scheduling request, additional information can be transmitted as signal modulation information. When BPSK modulation is used, additional information related to the scheduling request may be carried using one bit. When QPSK modulation is used, additional information related to the scheduling request may be carried using two bits.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting a scheduling request with additional information by a user equipment (UE) in a wireless communication system, the method comprising:
   receiving, by the UE from a base station (BS), radio resource allocation information that identifies an outermost frequency domain and within the same time domain portion of a control region of an uplink channel to be utilized for transmission of the scheduling request; and
   transmitting, by the UE to the BS, the scheduling request with the additional information via the identified outermost frequency domain portion of the control region of the uplink channel received in the radio resource allocation information,
   wherein the scheduling request with the additional information is modulated by a binary phase shift keying (BPSK) or a quadrature phase shift keying (QPSK).

2. The method of claim 1, wherein the scheduling request with the additional information is carried in 1-bit, when the scheduling request with the additional information is modulated by the BPSK.

3. The method of claim 1, wherein the scheduling request with the additional information is carried in 2-bit, when the scheduling request with the additional information is modulated by the QPSK.

4. The method of claim 1, further comprising receiving, by the UE from the BS, an uplink (UL) radio resource which is allocated by the BS based on the scheduling request.

5. The method of claim 4, further comprising transmitting, by the UE to the BS, UL data via the UL radio resource.

6. The method of claim 1, wherein the scheduling request is transmitted via the uplink channel only when the UE needs an uplink (UL) radio resource.

7. A method for allocating an uplink (UL) radio resource by a base station (BS) in a wireless communication system, the method comprising:

transmitting, by the BS to a user equipment (UE), radio resource allocation information for configuring an uplink channel for transmission of a scheduling request in at least one single carrier-frequency division multiple access symbol, wherein the radio resource allocation information identifies a frequency domain portion of a control region of the uplink channel to be utilized for transmission of the scheduling request, wherein the control region uses a different frequency band than a data region, and wherein the control region is used to only transmit a control signal and the data region is used to only transmit user data;

receiving, by the BS from the UE, the scheduling request with additional information via the identified frequency domain portion of the control region received in the radio resource allocation information; and allocating, by the BS to the UE, the UL radio resource based on the scheduling request, wherein the scheduling request with the additional information is modulated by a binary phase shift keying (BPSK) or a quadrature phase shift keying (QPSK).

8. The method of claim 7, wherein the scheduling request with the additional information is carried in 1-bit, when the scheduling request with the additional information is modulated by the BPSK.

9. The method of claim 7, wherein the scheduling request with the additional information is carried in 2-bit, when the scheduling request with the additional information is modulated by the QPSK.

10. The method of claim 7, wherein the scheduling request is received from the UE via the uplink channel only when the UE needs the UL radio resource.

11. The method of claim 7, wherein the scheduling request is not received from a UE which does not need the UL radio resource.

12. A user equipment (UE) in a wireless communication system, the UE comprising:

a transceiver; and a processor, operably coupled to the transceiver, that:

controls the transceiver to receive, from a base station (BS), radio resource allocation information for configuring an uplink channel for transmission of a scheduling request, wherein the radio resource allocation information identifies a frequency domain portion of a control region bordering a data region and within the same time domain to be utilized for transmission of the scheduling request, wherein the control region uses a different frequency band than the data region, and wherein the control region is used to transmit a control signal and the data region is used to transmit user data;

controls the transceiver to configure the uplink channel based on the radio resource allocation information; and controls the transceiver to transmit, to the BS, the scheduling request with additional information via the identified frequency domain portion of the control region of the uplink channel received in the radio resource allocation information, wherein the scheduling request with the additional information is modulated by a binary phase shift keying (BPSK) or a quadrature phase shift keying (QPSK).

13. The UE of claim 12, wherein the scheduling request with the additional information is carried in 1-bit, when the scheduling request with the additional information is modulated by the BPSK.

14. The UE of claim 12, wherein the scheduling request with the additional information is carried in 2-bit, when the scheduling request with the additional information is modulated by the QPSK.

15. The UE of claim 12, wherein the scheduling request is transmitted via the uplink channel only when the UE needs an uplink (UL) radio resource.

16. A base station (BS) in a wireless communication system, the BS comprising:

a transceiver; and a processor, operably coupled to the transceiver, that:

controls the transceiver to transmit, to a user equipment (UE) through a broadcast channel, radio resource allocation information for configuring an uplink channel for transmission of a scheduling request, wherein the radio resource allocation information identifies a frequency domain portion of a data region bordering a control region and within the same time domain to be utilized for transmission of the scheduling request, wherein the control region uses a different frequency band than the data region, and wherein the control region is used to only transmit a control signal and the data region is used to only transmit user data;

controls the transceiver to receive, from the UE, the scheduling request with additional information via the identified frequency domain portion of the data region of the uplink channel received in the radio resource allocation information; and allocates, to the UE, an uplink (UL) radio resource based on the scheduling request, wherein the scheduling request with the additional information is modulated by a binary phase shift keying (BPSK) or a quadrature phase shift keying (QPSK).

17. The BS of claim 16, wherein the scheduling request with the additional information is carried in 1-bit, when the scheduling request with the additional information is modulated by the BPSK.

18. The BS of claim 16, wherein the scheduling request with the additional information is carried in 2-bit, when the scheduling request with the additional information is modulated by the QPSK.

19. The BS of claim 16, wherein the scheduling request is received from the UE via the uplink channel only when the UE needs the UL radio resource.

20. The BS of claim 16, wherein the scheduling request is not received from a UE which does not need the UL radio resource.

\* \* \* \* \*